United States Patent
Ichikawa

(10) Patent No.: US 9,233,617 B2
(45) Date of Patent: Jan. 12, 2016

(54) POWER CONVERSION FACILITY, ELECTRICALLY-POWERED VEHICLE, AND CHARGING SYSTEM FOR ELECTRICALLY-POWERED VEHICLE

(75) Inventor: Shinji Ichikawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 200 days.

(21) Appl. No.: 13/983,410

(22) PCT Filed: Mar. 24, 2011

(86) PCT No.: PCT/JP2011/057102
§ 371 (c)(1),
(2), (4) Date: Aug. 2, 2013

(87) PCT Pub. No.: WO2012/127673
PCT Pub. Date: Sep. 27, 2012

(65) Prior Publication Data
US 2014/0002023 A1    Jan. 2, 2014

(51) Int. Cl.
*H02J 7/00* (2006.01)
*B60L 11/18* (2006.01)
*H02J 7/02* (2006.01)

(52) U.S. Cl.
CPC .......... *B60L 11/1811* (2013.01); *B60L 11/185* (2013.01); *B60L 11/1812* (2013.01); *B60L 11/1824* (2013.01); *B60L 11/1842* (2013.01); *H02J 7/022* (2013.01); *B60L 2210/30* (2013.01); *B60L 2210/40* (2013.01); *B60L 2230/20* (2013.01); *B60L 2230/22* (2013.01); *B60L 2230/28* (2013.01); *B60L 2230/30* (2013.01); *Y02E 60/721* (2013.01); *Y02T 10/7005* (2013.01); *Y02T 10/7088* (2013.01); *Y02T 10/7241* (2013.01); *Y02T 90/121* (2013.01); *Y02T 90/127* (2013.01); *Y02T 90/128* (2013.01); *Y02T 90/14* (2013.01); *Y04S 10/126* (2013.01)

(58) Field of Classification Search
USPC .................................. 320/106, 109, 128, 134
See application file for complete search history.

(56) References Cited

U.S. PATENT DOCUMENTS

| | | | |
|---|---|---|---|
| 8,242,627 B2 * | 8/2012 | Ichikawa | 307/10.1 |
| 2008/0157593 A1 * | 7/2008 | Bax et al. | 307/10.1 |
| 2010/0040914 A1 * | 2/2010 | Ramaswamy et al. | 429/14 |

(Continued)

FOREIGN PATENT DOCUMENTS

| | | |
|---|---|---|
| CN | 1540835 A | 10/2004 |
| JP | A-5-276674 | 10/1993 |

(Continued)

*Primary Examiner* — Brian Ngo
(74) *Attorney, Agent, or Firm* — Oliff PLC

(57) ABSTRACT

A power conversion facility has a function of converting DC power from a DC power source into AC power comparable to that generated by a system power supply. The power conversion facility includes: an inverter for performing a bidirectional DC-AC power conversion; and an isolation transformer connected between the system power supply and the inverter. An electrically-powered vehicle includes a main battery and a charging inlet. When a request to charge the main battery is made under a condition that a connector of the power conversion facility and the charging inlet are electrically connected to each other by a charging cable, the power conversion facility converts AC power which is supplied from the system power supply through the isolation transformer into DC power and outputs the DC power to the connector.

19 Claims, 6 Drawing Sheets

(56) References Cited

U.S. PATENT DOCUMENTS

| | | |
|---|---|---|
| 2010/0131137 A1* | 5/2010 | Iida .................................. 701/22 |
| 2011/0204851 A1* | 8/2011 | Manotas, Jr. .................. 320/128 |
| 2012/0123625 A1 | 5/2012 | Ueo et al. |

FOREIGN PATENT DOCUMENTS

| | | |
|---|---|---|
| JP | A-6-178461 | 6/1994 |
| JP | A-8-88908 | 4/1996 |
| JP | A-9-46917 | 2/1997 |
| JP | A-9-233712 | 9/1997 |
| JP | A-2001-514838 | 9/2001 |
| JP | A-2010-41819 | 2/2010 |
| WO | WO 98/40950 A1 | 9/1998 |
| WO | WO 2010/082506 A1 | 7/2010 |
| WO | WO 2011/016134 A1 | 2/2011 |

\* cited by examiner

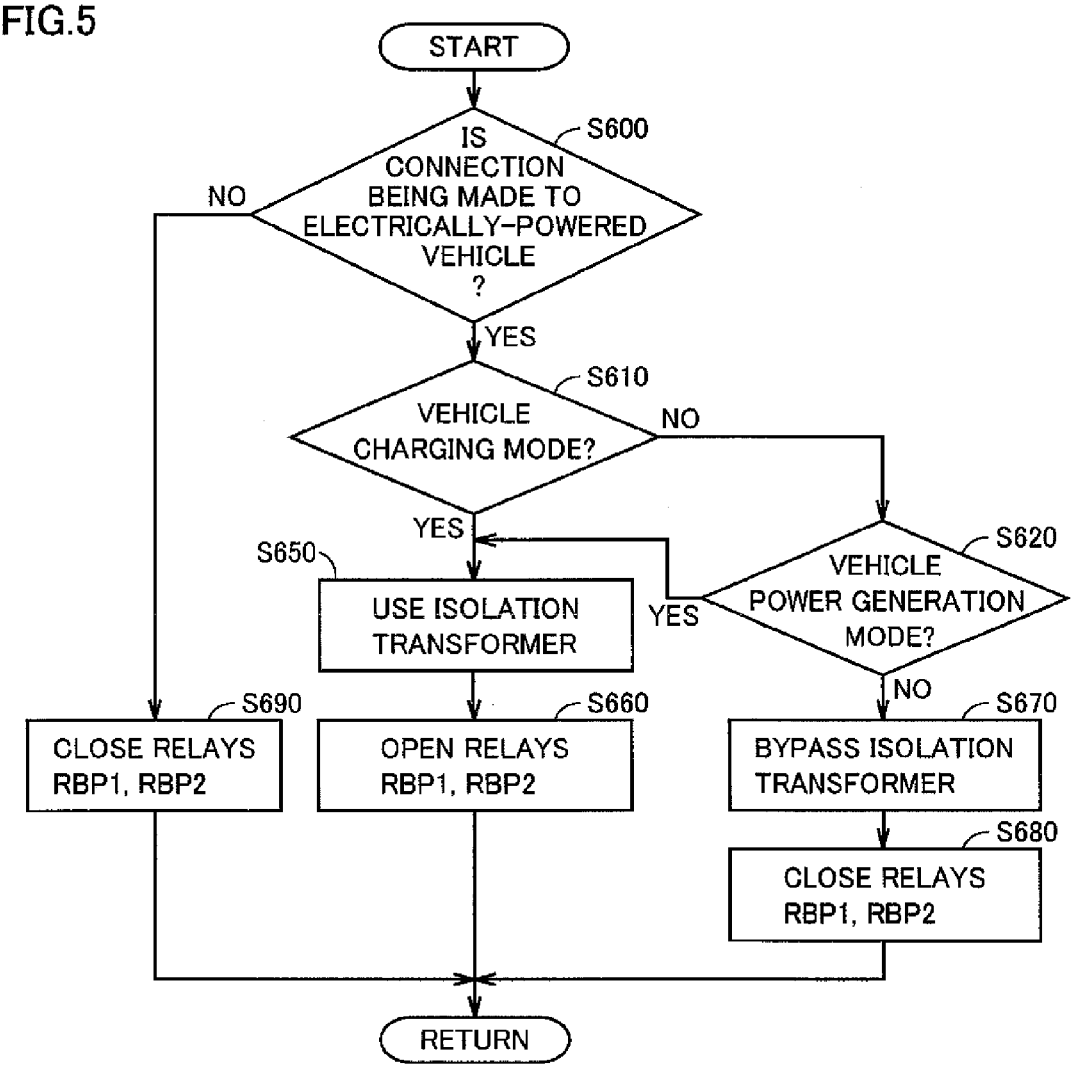

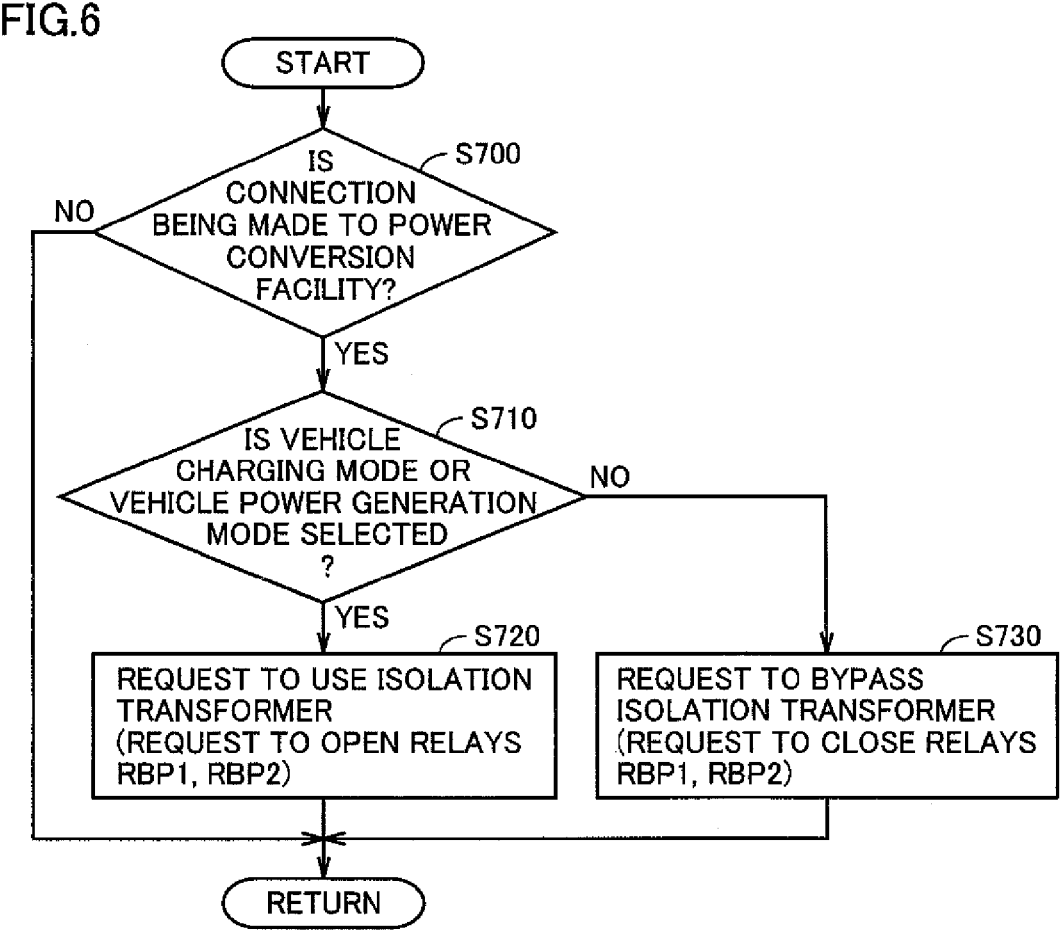

POWER CONVERSION FACILITY, ELECTRICALLY-POWERED VEHICLE, AND CHARGING SYSTEM FOR ELECTRICALLY-POWERED VEHICLE

TECHNICAL FIELD

The present invention relates to a power conversion facility, an electrically-powered vehicle, and a charging system for an electrically-powered vehicle, and more specifically to charging of a vehicle-mounted power storage device, which is mounted on an electrically-powered vehicle, by means of a power conversion facility provided externally to the vehicle.

BACKGROUND ART

Development is being pursued of electrically-powered vehicles such as electric vehicle, hybrid vehicle, and the like in which an electric motor for running the vehicle is driven by electric power from a power storage device which is typically a secondary battery. For these electrically-powered vehicles, it has been proposed to charge the vehicle-mounted power storage device by a power supply provided externally to the vehicle (the power supply will also be referred to simply as "external power supply" hereinafter). In the following, charging of a vehicle-mounted power storage device by means of an external power supply will also be referred to simply as "external charging."

Japanese Patent Laying-Open No. 8-88908 (PTD 1) discloses a configuration of a charging device for charging a vehicle-mounted power storage device of an electrically-powered vehicle from a commercial power supply through an isolation transformer. As disclosed in PTD 1, it is preferable for the sake of safety to electrically isolate the vehicle-mounted power storage device and the external power supply from each other by the isolation transformer.

The charging device of PTD 1 has a configuration in which a diode arm is added to an inverter which is provided for running the vehicle. The diode arm and one arm of the inverter are used to convert AC power from the commercial power supply into DC power for charging the power storage device. In the configuration of PTD 1, the configuration of a component (inverter for running the vehicle) mounted on the electrically-powered vehicle is also used partially for external charging, to thereby enable the charging device to be downsized.

CITATION LIST

Patent Document

PTD 1: Japanese Patent Laying-Open No. 8-88908

SUMMARY OF INVENTION

Technical Problem

In recent years, application of power generation facilities based on clean energy, specifically application of a solar photovoltaic power generation system, a fuel cell system and the like that respectively use a solar cell and a fuel cell as their DC power sources has been expanding. Also, development has been being pursued of a system using a stationary secondary battery as a DC power source to generate AC power comparable to that generated by a system power supply.

For these systems each, a power conversion facility called power conditioner is provided for converting DC power from the DC power source into AC power. Accordingly, there is a possibility that external charging of an electrically-powered vehicle can also be done in conjunction with the aforementioned power conversion facility to simplify the configuration for the vehicle.

The present invention has been made to solve the above-described challenge, and an object of the invention is to provide an efficient configuration for charging a vehicle-mounted power storage device of an electrically-powered vehicle by means of a power conversion facility which is used for power conversion between a DC power source and a system power supply.

Solution to Problem

According to an aspect of the present invention, a charging system for an electrically-powered vehicle includes: a power conversion facility provided between a DC power source and a system power supply; and an electrically-powered vehicle mounted with a power storage device. The power conversion facility includes an inverter, a first switch, an isolation transformer, and a connector. The inverter is configured to perform a bidirectional DC-AC power conversion between a first electric power line electrically connected to the DC power source and a second electric power line. The first switch is connected between the first electric power line and the inverter. The isolation transformer is connected between the second electric power line and the system power supply. The connector is electrically connected to the first electric power line. The electrically-powered vehicle includes a charging inlet and a converter. The charging inlet is electrically connected to the first electric power line by a charging cable. The converter is configured to convert DC power transmitted to the charging inlet into charging power for the power storage device. The power conversion facility further includes a control unit. The control unit is configured to close the first switch and control the inverter in such a manner that causes the inverter to convert AC power from the system power supply into DC power and output the DC power to the first electric power line, in a case where the power storage device is to be charged under a condition that the connector is electrically connected to the charging inlet.

Preferably, the power conversion facility further includes a second switch. The second switch is provided between the system power supply and the second electric power line in such a manner that the isolation transformer is bypassed. The control unit opens the second switch while electric power is being given and received between the system power supply and the power storage device.

More preferably, the control unit closes the second switch in controlling the inverter in such a manner that causes the inverter to convert DC power from the DC power source into AC power for the system power supply, in a case where electric power is not being given and received between the system power supply and the power storage device.

Still preferably, the power conversion facility further includes a third switch. The third switch is connected between the DC power source and the first electric power line. In a case where the power storage device is to be charged under a condition that the connector is electrically connected to the charging inlet, the control unit opens the third switch when supplied electric power from the DC power source is smaller than a threshold value.

Still preferably, in a case where the AC power is to be generated from electric power of the power storage device under a condition that the connector is electrically connected to the charging inlet, the control unit closes the first switch and controls the inverter in such a manner that causes the inverter to convert DC power which is output from the power storage device to the first electric power line into AC power for the system power supply and output the AC power to the second electric power line.

Preferably, in a case where the power storage device is to be charged under a condition that the connector is electrically connected to the charging inlet, the control unit opens the first switch, stops the inverter, and controls the power conversion facility in such a manner that electric power from the DC power source is output to the first electric power line, in accordance with an instruction from a user.

According to another aspect of the present invention, a power conversion facility provided between a DC power source and a system power supply includes a first switch, an inverter, an isolation transformer, a connector, and a control unit. The inverter is configured to perform a bidirectional DC-AC power conversion between a first electric power line electrically connected to the DC power source and a second electric power line. The first switch is connected between the first electric power line and the inverter. The isolation transformer is connected between the second electric power line and the system power supply. The connector is electrically connected to the first electric power line and configured to be electrically connectable to a charging inlet of an electrically-powered vehicle by a charging cable. Further, the connector is electrically connected to a power storage device mounted on the electrically-powered vehicle by being connected to the charging inlet by the charging cable. The control unit closes the first switch and controls the inverter in such a manner that causes the inverter to convert AC power from the system power supply into DC power and output the DC power to the first electric power line, in a case where the power storage device is to be charged under a condition that the connector is electrically connected to the charging inlet.

Preferably, the power conversion facility further includes a second switch. The second switch is provided between the system power supply and the second electric power line in such a manner that the isolation transformer is bypassed. The control unit opens the second switch while electric power is being given and received between the system power supply and the power storage device.

More preferably, the control unit closes the second switch in controlling the inverter in such a manner that causes the inverter to convert DC power from the DC power source into AC power for the system power supply, in a case where electric power is not being given and received between the system power supply and the power storage device.

Preferably, the power conversion facility further includes a third switch. The third switch is connected between the DC power source and the first electric power line. In a case where the power storage device is to be charged under a condition that the connector is electrically connected to the charging inlet, the control unit opens the third switch when supplied electric power from the DC power source is smaller than a threshold value.

Still preferably, in a case where the AC power is to be generated from electric power of the power storage device under a condition that the connector is electrically connected to the charging inlet, the control unit closes the first switch and controls the inverter in such a manner that causes the inverter to convert DC power which is output from the power storage device to the first electric power line into AC power for the system power supply and output the AC power to the second electric power line.

Still preferably, in a case where the power storage device is to be charged under a condition that the connector is electrically connected to the charging inlet, the control unit opens the first switch, stops the inverter, and controls the power conversion facility in such a manner that electric power from the DC power source is output to the first electric power line, in accordance with an instruction from a user.

According to still another aspect of the present invention, an electrically-powered vehicle includes a power storage device, a charging inlet, a converter, and a control unit. The charging inlet is configured to be electrically connectable, by a charging cable, to a connector of a power conversion facility provided between a DC power source and a system power supply. The first power conversion unit is configured to convert DC power transmitted to the charging inlet into charging power for the power storage device. The control unit is configured to request the power conversion facility to charge the power storage device. In a case where the power storage device is to be charged under a condition that the charging inlet and the connector are electrically connected to each other by the charging cable, the control unit requests the power conversion facility to control an inverter, which is for performing a bidirectional DC-AC power conversion between a first electric power line electrically connected to the DC power source and a second electric power line connected to the system power supply through an isolation transformer, in such a manner that causes the inverter to convert AC power from the system power supply into DC power and output the DC power to the first electric power line, and to close a first switch connected between the first electric power line and the inverter.

Preferably, in a case where the AC power is to be generated from electric power of the power storage device under a condition that the connector and the charging inlet are electrically connected to each other by the charging cable, the control unit requests the power conversion facility to close the first switch and to control the inverter in such a manner that causes the inverter to convert DC power which is output from the power storage device to the first electric power line into AC power for the system power supply and output the AC power to the second electric power line.

Still preferably, while electric power is being given and received between the system power supply and the power storage device, the control unit requests the power conversion facility to open a second switch provided between the system power supply and the second electric power line in such a manner that the isolation transformer is bypassed.

More preferably, in a case where electric power is not being given and received between the system power supply and the power storage device, the control unit requests the power conversion facility to close the second switch in controlling the inverter in such a manner that causes the inverter to convert DC power from the DC power source into AC power for the system power supply.

Still preferably, in a case where the power storage device is to be charged under a condition that the connector and the charging inlet are electrically connected to each other, the control unit requests the power conversion facility to open a third switch connected between the DC power source and the first electric power line, when supplied electric power from the DC power source is smaller than a threshold value.

Still preferably, the first power conversion unit is configured to perform a bidirectional DC voltage conversion between a third electric power line and the power storage device. The electrically-powered vehicle further includes a first switch element, an electric motor for generating vehicle driving force, a second power conversion unit, and a second switch element. The first switch element is connected between the charging inlet and the third electric power line.

The second power conversion unit is configured to control an output of the electric motor by performing a bidirectional power conversion between the third electric power line and the electric motor. The second switch element is connected between the third electric power line and the power conversion unit.

Preferably, in a case where the power storage device is to be charged under a condition that the connector and the charging inlet are electrically connected to each other, the control unit requests, in response to an instruction from a user, the power conversion facility to open the first switch, to stop the inverter, and to output electric power from the DC power source to the first electric power line.

Advantageous Effects of Invention

In accordance with the present invention, a power conversion facility which is used for power conversion between a DC power source and a system power supply can be utilized to provide an efficient configuration for charging a vehicle-mounted power storage device of an electrically-powered vehicle.

BRIEF DESCRIPTION OF DRAWINGS

FIG. 5 is a first flowchart illustrating a control process for relays provided for bypassing an isolation transformer.

FIG. 6 is a second flowchart illustrating a control process for relays provided for bypassing an isolation transformer.

DESCRIPTION OF EMBODIMENTS

Figure 1:
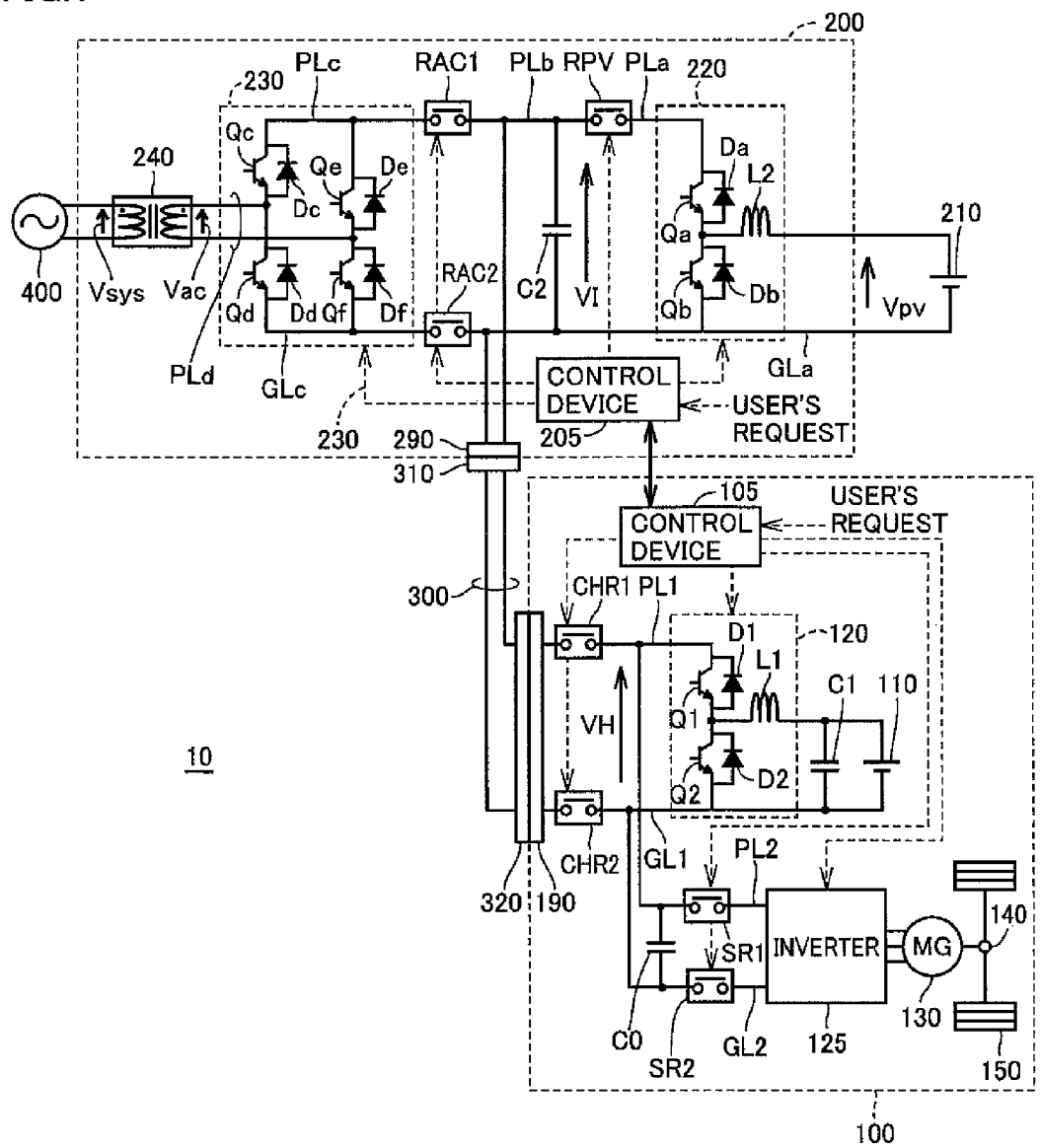
FIG. 1 is a block diagram illustrating a configuration of a charging system for an electrically-powered vehicle according to a first embodiment of the present invention.

Embodiments of the present invention will hereinafter be described in detail with reference to the drawings. In the following, the same or corresponding parts in the drawings are denoted by the same reference characters and a description thereof will not be repeated in principle.

First Embodiment

FIG. 1 is a block diagram illustrating a configuration of a charging system for an electrically-powered vehicle according to a first embodiment of the present invention.

Referring to FIG. 1, a charging system 10 for an electrically-powered vehicle includes electrically-powered vehicle 100 and a power conversion facility 200. Power conversion facility 200 is installed externally to electrically-powered vehicle 100.

Electrically-powered vehicle 100 includes a main battery 110, a control device 105, a converter 120, an inverter 125, a motor generator 130, a power transmission gear 140, and drive wheels 150.

Control device 105 is configured by an electronic control unit (ECU) having a memory and a CPU (Central Processing Unit) therein, which are not shown in the drawing. The ECU is configured to perform an arithmetic operation using values detected respectively by sensors, based on a map and a program stored in its memory. Alternatively, at least a part of the ECU may be configured to perform a predetermined numerical/logical operation by means of hardware such as electronic circuit. To control device 105, various user's requests can be input from a control element such as switch, touch panel, or the like (not shown) mounted on electrically-powered vehicle 100. Also, control device 105 can detect various vehicle's states based on respective outputs of a plurality of sensors (not shown).

Main battery 110 is illustrated as an example of "power storage device" mounted on electrically-powered vehicle 100. For example, the output voltage of main battery 110 is approximately 200 V. Main battery 110 is typically configured by a secondary battery such as lithium-ion battery, nickel-metal hydride battery, or the like. Alternatively, "power storage device" may be configured by an electrical double layer capacitor, a combination of a secondary battery and a capacitor, or the like.

Converter 120 is configured to perform a bidirectional DC voltage conversion between the voltage of main battery 110 and DC voltage VH of an electric power line PL1. In the example of FIG. 1, converter 120 is configured by a so-called voltage boost chopper including power semiconductor switching elements Q1, Q2, antiparallel diodes D1, D2, and a reactor L1. As the power semiconductor switching element (hereinafter also referred to simply as "switching element"), any element whose ON/OFF can be controlled, such as IGBT (Insulated Gate Bipolar Transistor), power MOS (Metal Oxide Semiconductor) transistor, power bipolar transistor, or the like, may be used.

A smoothing capacitor C1 is disposed between main battery 110 and converter 120 to remove harmonic components superimposed on DC voltage/current.

Motor generator 130 is configured for example by a permanent-magnet-type three-phase synchronous electric motor. Inverter 125 has the configuration of a common three-phase converter. Inverter 125 performs a bidirectional DC-AC power conversion between DC power on an electric power line PL2 and AC power to be supplied to motor generator 130, so that motor generator 130 operates in accordance with an operational command (typically torque command value). Namely, the output torque of motor generator 130 is controlled by inverter 125.

The output torque of motor generator 130 is transmitted to drive wheels 150 through power transmission gear 140 configured by a speed reducer and a power split device for example to thereby cause electrically-powered vehicle 100 to run. Also, motor generator 130 generates electric power from a rotational force of drive wheels 150 when electrically-powered vehicle 100 is regeneratively braked. The generated electric power is converted by inverter 125 into DC power. The DC power is used through converter 120 for charging main battery 110.

In a hybrid vehicle mounted with an engine (not shown) besides motor generator 130, this engine and motor generator 130 are operated in coordination with each other to generate vehicle's driving force necessary for electrically-powered vehicle 100. At this time, electric power generated by means of rotation of the engine can also be used to charge main battery 110. Thus, electrically-powered vehicle 100 generally represents a vehicle mounted with an electric motor for running the vehicle and a power storage device, and includes both a hybrid vehicle generating the vehicle's driving force by the engine and the electric motor and an electric vehicle, a fuel cell vehicle, and the like on which the engine is not mounted.

Electrically-powered vehicle 100 further includes a charging inlet 190, charging relays CHR1, CHR2, and system relays SR1, SR2.

Charging relays CHR1 and CHR2 are disposed between electric power line PL1 and charging inlet 190 and between a ground line GL1 and charging inlet 190, respectively. Charging inlet 190 is configured to be electrically connectable to power conversion facility 200 by a charging cable 300.

System relay SR1 is disposed between electric power line PL1 and electric power line PL2 connected to inverter 125. System relay SR2 is disposed between ground line GL1 and a ground line GL2 connected to inverter 125. When system relays SR1, SR2 are closed, a smoothing capacitor C0 smoothes the DC link voltage of inverter 125. Smoothing capacitor C0 is disposed to precede system relays SR1, SR2 (disposed on the main battery side) so that smoothing capacitor C0 can also be utilized when main battery 110 is charged/discharged with system relays SR1, SR2 opened.

Regarding the present embodiment, each relay is illustrated as a typical example of "switch" or "switch element." Namely, instead of the relay, any element whose open and close can be controlled may be used.

Control device 105 controls the equipment mounted on electrically-powered vehicle 100 based on user's requests and the vehicle's state so that electrically-powered vehicle 100 may run appropriately. In the configuration of FIG. 1, control device 105 controls open/close of charging relays CHR1, CHR2 and system relays SR1, SR2 and respective operations of converter 120 and inverter 125.

When electrically-powered vehicle 100 is running, charging relays CHR1, CHR2 are opened while system relays SR1, SR2 are closed. Accordingly, main battery 110 and electric power line PL2 are electrically connected to each other to thereby enable the vehicle to be run by motor generator 130 while main battery 110 is charged/discharged. Meanwhile, when the vehicle is running, charging inlet 190 can be electrically disconnected from main battery 110.

When external charging of electrically-powered vehicle 100 is performed, charging inlet 190 is electrically connected by charging cable 300 to a connector 290 of power conversion facility 200. Specifically, charging cable 300 is configured in such a manner that a connector 310 of charging cable 300 is normally connected to connector 290 of power conversion facility 200 and a connector 320 of charging cable 300 is normally connected to charging inlet 190 to thereby electrically connect connector 290 of power conversion facility 200 and charging inlet 190 to each other. When charging cable 300 is normally connected, a signal (not shown) indicating that connector 290 and charging inlet 190 are electrically connected to each other is input to at least control device 105.

When external charging is performed, charging relays CHR1, CHR2 are closed while system relays SR1, SR2 are opened. Accordingly, under the condition that the equipment (such as inverter 125 and motor generator 130) located subsequently to electric power line PL2 and ground line GL2 and configured to run the vehicle is electrically disconnected, an electrical path can be formed between power conversion facility 200 and main battery 110.

Further, control device 105 is configured to be capable of communicating information or data with a control device 205 in power conversion facility 200, which will be described later herein, at least when external charging is performed.

Next, a configuration of power conversion facility 200 will be described. Power conversion facility 200 is disposed between a DC power source 210 and a system power supply 400.

DC power source 210 is typically an electric power source generating DC power from clean energy, such as solar cell, fuel cell, or the like. Alternatively, a device that temporarily stores electric power like stationary secondary battery may also be used as DC power source 210. DC power source 210 outputs DC voltage Vpv.

System power supply 400 is configured by a commercial AC power supply. In the following, the voltage of AC power supplied by system power supply 400 will be indicated by AC voltage Vsys.

Power conversion facility 200 includes a converter 220, an inverter 230, an isolation transformer 240, and control device 205.

Control device 205 is configured, like control device 105, by an electronic control unit (ECU). Control device 105 and control device 205 are configured to be capable of communicating information, data, or the like with each other. The communication path between control device 105 and control device 205 may be implemented by wireless, or by so-called power line communication when charging cable 300 is connected.

To control device 205, various user's requests can be input from a control element such as switch, touch panel, or the like (not shown) mounted on power conversion facility 200.

Converter 220 is configured to perform a bidirectional DC voltage conversion between output voltage Vpv of DC power source 210 and the DC voltage of an electric power line PLa. For example, converter 220 is configured, like converter 120, by a voltage boost chopper. Namely, converter 220 is configured to include switching elements Qa, Qb, antiparallel diodes Da, Db and a reactor L2.

In the case of a system configuration where DC power source 210 is not charged, converter 220 may be configured to perform a unidirectional DC voltage conversion from DC power source 210 to electric power line PLa. In this case, a circuit configuration without switching element Qa so that the upper arm is only diode Da may be applied. Alternatively, in the case of a system configuration in which output voltage Vpv of DC power source 210 is stable, converter 220 may be dispensed with.

Between electric power line PLa and an electric power line PLb, a relay RPV is disposed. Open/close of relay RPV is controlled by control device 205. Relay RPV can be opened to electrically disconnect converter 220 and DC power source 210 from electric power line PLb.

Between electric power line PLb and a ground line GLa, a smoothing capacitor C2 is connected. Smoothing capacitor C2 removes harmonic components of DC voltage Vl of electric power line PLb.

Inverter 230 is configured to perform a bidirectional DC-AC power conversion between an electric power line PLc and an electric power line PLd. For example, inverter 230 is configured by a full bridge circuit made up of switching elements Qc to Qf. To switching elements Qc to Qf, antiparallel diodes Dc to Df are connected, respectively.

Isolation transformer 240 is connected between electric power line PLd and system power supply 400. The voltage magnitude ratio between AC voltage Vsys of system power supply 400 and AC voltage Vac of electric power line PLd is determined in accordance with the turn ratio of isolation transformer 240.

Between electric power line PLb and electric power line PLc, a relay RAC1 is disposed. Likewise, between ground line GLa and a ground line GLc, a relay RAC2 is disposed. Open/close of relays RAC1, RAC2 is controlled by control device 205. Relays RAC1, RAC2 can be opened to electrically disconnect inverter 230 and system power supply 400 from electric power line PLb.

Connector 290 is electrically connected to electric power line PLb and ground line GLa. Connector 290 is configured to be electrically connectable to connector 310 of charging cable 300. Electrical connection made by charging cable 300 between connector 290 and charging inlet 190 enables DC power of electric power line PLb to be transmitted to electrically-powered vehicle 100. On the contrary, DC power from electrically-powered vehicle 100 can also be transmitted to electric power line PLb.

The operation of converter 220 is controlled by control device 205 while relay RPV is closed. Specifically, in response to a control signal from control device 205, the ON/OFF ratio (duty ratio) of switching elements Qa, Qb is controlled to thereby control the voltage ratio (VI/Vpv). In contrast, while relay RPV is opened, converter 220 is stopped by control device 205. In this state, switching elements Qa, Qb are fixed in the OFF state.

The operation of inverter 230 is controlled by control device 205 while relays RAC1, RAC2 are closed. Inverter 230 is capable of selectively performing one of a first power converting operation of converting AC power (AC voltage Vac) of electric power line PLd into DC power (DC voltage VI) to output the resultant DC power to electric power line PLc and a second power converting operation of converting DC power of electric power line PLc into AC power to output the resultant AC power to electric power line PLd.

For the first power converting operation, control device 205 can control, by controlling the duty of switching elements Qc to Qf, the DC voltage (current) which is output to electric power line PLc. Likewise, for the second power converting operation, control device 205 can control, by controlling the duty of switching elements Qc to Qf, the phase and amplitude of the AC voltage (current) which is output to electric power line PLd. While relays RAC1, RAC2 are opened, inverter 230 is stopped by control device 205. In this state, switching elements Qc to Qf are fixed in the OFF state.

It is noted here for the sake of confirmation that the voltage and current of each of the components in electrically-powered vehicle 100 and power conversion facility 200 can be detected by control devices 105, 205 through the use of sensors as appropriate, which, however, is not shown.

In power conversion facility 200 in the configuration of FIG. 1, electric power line PLb corresponds to "first electric power line" and electric power line PLd corresponds to "second electric power line." Further, relays RAC1, RAC2 correspond to "first switch" and relay RPV corresponds to "third switch." In electrically-powered vehicle 100, electric power line PL1 corresponds to "third electric power line," charging relays CHR1, CHR2 correspond to "first switch element" and system relays SR1, SR2 correspond to "second switch element." Converter 120 corresponds to "first power conversion unit" and inverter 125 corresponds to "second power conversion unit."

Next, an operation of charging system 10 will be described.

Power conversion facility 200 essentially functions as a so-called power conditioner for converting DC power from DC power source 210 into AC power comparable to that generated by system power supply 400. Therefore, in the case where none of the vehicle charging mode and the vehicle power generation mode is selected, a normal operation of power conversion facility 200 is as follows.

Control device 205 closes relays RPV, RAC1, RAC2. Then, in accordance with duty control by control device 205, converter 220 converts output voltage Vpv of DC power source 210 into DC voltage VI and outputs the resultant DC voltage to electric power line PLb. Inverter 230 operates to convert DC voltage VI of electric power line PLb into AC voltage Vac and outputs the resultant AC voltage to electric power line PLd. The amplitude and the phase of AC voltage Vac are adjusted under ON/OFF control of switching elements Qc to Qf by control device 205. Then, AC voltage Vac of electric power line PLd is converted through isolation transformer 240 into AC voltage Vsys. Accordingly, AC power comparable to that generated by system power supply 400 is output from power conversion facility 200. In the following, an operational state of converting DC power from DC power source 210 into AC power and outputting the resultant AC power to system power supply 400 will also be referred to as "normal mode."

In charging system 10 for an electrically-powered vehicle in the first embodiment of the present invention, it is possible, under the condition that electrically-powered vehicle 100 and power conversion facility 200 are connected to each other by charging cable 300, that electric power from power conversion facility 200 is used to charge main battery 110 of electrically-powered vehicle 100. In the following, this operational state will also be referred to as "vehicle charging mode."

It is also possible, under the condition that electrically-powered vehicle 100 and power conversion facility 200 are electrically connected to each other, that charging system 10 operates to use the electric power of main battery 110 and thereby output AC power comparable to that generated by system power supply 400. In the following, this operational state will also be referred to as "vehicle power generation mode."

The vehicle charging mode and the vehicle power generation mode are each activated for example in response to a user's request which is input to control device 105 and/or control device 205 under the condition that electrically-powered vehicle 100 and power conversion facility 200 are connected to each other by charging cable 300.

First, an operation of charging system 10 in the vehicle charging mode will be described.

Power conversion facility 200 can generate charging power for main battery 110 using electric power from system power supply 400, by operating inverter 230 while relays RAC1, RAC2 are closed. Specifically, inverter 230 is controlled so that it converts AC voltage Vac of electric power line PLd into DC voltage VI and outputs this DC voltage to electric power line PLc. In this way, DC power generated from AC power from system power supply 400 is generated on electric power line PLb and transmitted to charging inlet 190 through connector 290 and charging cable 300. The command value for DC voltage VI in the vehicle charging mode is set to a value suitable for charging main battery 110.

In electrically-powered vehicle 100, the DC power transmitted to charging inlet 190 is converted by converter 120 into charging power for main battery 110. In this way, the electric power from system power supply 400 can be used to perform external charging of main battery 110.

In contrast, power conversion facility 200 can also generate charging power for main battery 110 using electric power from DC power source 210, by operating converter 220 while relay RPV is closed. Specifically, converter 220 is controlled so that it converts DC voltage Vpv from DC power source 210 into DC voltage VI and outputs this DC voltage to electric power line PLb. In this way, DC power from DC power source 210 is generated on electric power line PLb and transmitted to charging inlet 190 through connector 290 and charging cable 300.

Relay RPV and relays RAC1, RAC2 are controlled independently of each other by control device 205. Relay RPV can be opened and relays RAC1, RAC2 can be closed to charge main battery 110 with only the electric power of system power supply 400, without using DC power source 210.

On the contrary, relay RPV can be closed and relays RAC1, RAC2 can be opened to charge main battery 110 with only the electric power of DC power source 210, without using electric power from system power supply 400. In this case, external charging without using system power supply 400, namely without electricity cost (hereinafter also referred to as "eco-charging") can be implemented.

Alternatively, both relay RPV and relays RAC1, RAC2 can be closed to perform external charging of main battery 110 using both the electric power from system power supply 400 and the electric power from DC power source 210.

Next, an operation of charging system 10 in the vehicle power generation mode will be described.

In electrically-powered vehicle 100, control device 105 closes charging relays CHR1, CHR2 and operates converter 120. Meanwhile, system relays SR1, SR2 are opened. Converter 120 is controlled by control device 105 so that converter 120 converts an output voltage of main battery 110 into DC voltage VH and outputs the resultant DC voltage to electric power line PL1. DC voltage VH of electric power line PL1 is transmitted to connector 290 of power conversion facility 200 through charging inlet 190 and charging cable 300.

In power conversion facility 200, DC voltage VI of electric power line PLb is comparable to DC voltage VH from electrically-powered vehicle 100. Control device 205 closes at least relays RAC1, RAC2 and operates inverter 230. As in the normal mode, inverter 230 operates to convert DC voltage VI (VI=VH) of electric power line PLb into AC voltage Vac and output the resultant AC voltage to electric power line PLd. Then, AC voltage Vac of electric power line PLd is converted through isolation transformer 240 into AC voltage Vsys. In this way, power conversion facility 200 can generate AC power comparable to that of the normal mode, using electric power of main battery 110 in electrically-powered vehicle 100.

In the vehicle power generation mode, the AC power can also be generated using both the electric power from DC power source 210 and the electric power from electrically-powered vehicle 100 (main battery 110), by closing relay RPV. Alternatively, AC power can also be generated using only the electric power from electrically-powered vehicle 100 (main battery 110) without using the electric power from DC power source 210, by opening relay RPV.

In charging system 10 of the first embodiment, power conversion facility 200 is provided with isolation transformer 240 and relays RAC1, RAC2 which are not requisite components in the case where only the normal operation mode is applied. Accordingly, external charging of main battery 110 with ensured electrical isolation provided by the isolation transformer can be implemented, by allowing the circuit elements of power conversion facility 200 to be shared between power conversion facility 200 and electrically-powered vehicle 100, which does not increase the number of components mounted on electrically-powered vehicle 100.

Next, an example of a specific control process in charging system 10 shown in FIG. 1 will be described.

Figure 2:
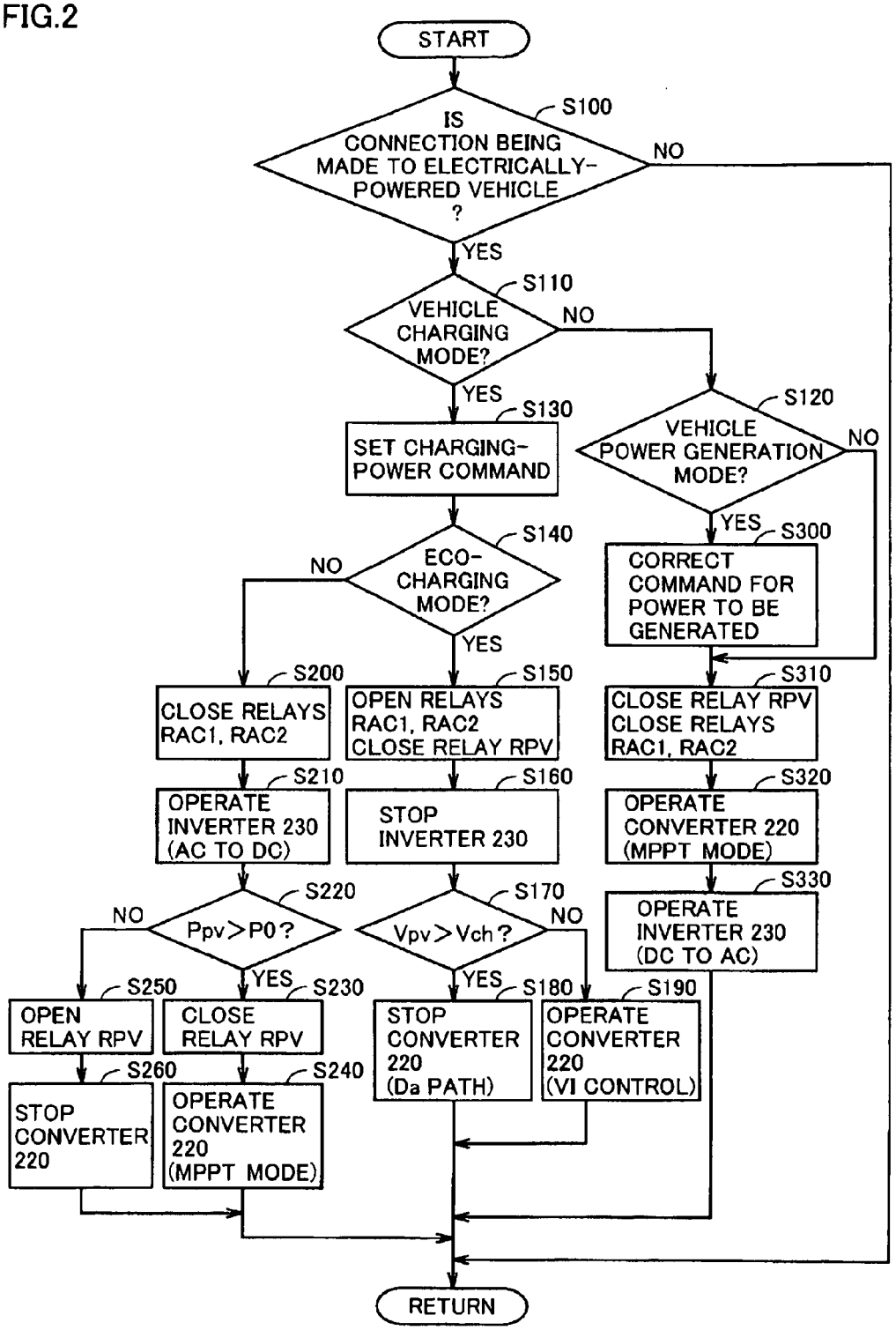
FIG. 2 is a flowchart illustrating a control process performed in a power conversion facility of the charging system according to the first embodiment of the present invention.

FIG. 2 illustrates control performed in power conversion facility 200 of the charging system in the first embodiment. Each step shown in the flowchart of FIG. 2 is performed through a software process and/or a hardware process performed by control device 205. Control device 205 performs the control process in accordance with the flowchart of FIG. 2 periodically at predetermined intervals.

Referring to FIG. 2, control device 205 determines in step S100 whether or not electrically-powered vehicle 100 is connected to power conversion facility 200 by charging cable 300. The determination in step S100 is made based on the state of connection of charging cable 300. For example, when a signal indicating that charging cable 300 is normally connected to connector 290 of power conversion facility 200 and to charging inlet 190 is input to control device 205 from charging cable 300 or control device 105, the determination in step S100 is YES.

When electrically-powered vehicle 100 is connected (YES in S100), control device 205 determines in step S110 whether or not the vehicle charging mode is selected. When the vehicle charging mode is not selected (NO in S110), control device 205 further determines in step S120 whether or not the vehicle power generation mode is selected.

If main battery 110 is in the state of being unable to be charged or unable to generate power, none of the vehicle charging mode and the vehicle power generation mode is selected even if a user's request is made. In other words, when it is determined in steps S110, S120 that the vehicle charging mode or the vehicle power generation mode is selected, it is accordingly indicated that main battery 110 is in the state of being able to be charged or able to generate power.

When the vehicle charging mode is selected (YES in S110), control device 205 proceeds to step S130 to set a charging-power command for external charging. For example, based on a value of requested charging power that is transmitted from control device 105, the charging-power command for power conversion facility 200 is calculated. For example, in electrically-powered vehicle 100, the value of requested charging power can be set based on the SOC (State Of Charge) of main battery 110.

Control device 205 may further determine in step S140 whether or not the eco-charging mode is selected for which the eco-charging is assigned. The eco-charging mode is selected based on a user's request which is input to control device 105 of electrically-powered vehicle 100 and/or a user's request which is input to control device 205 of power conversion facility 200.

When the eco-charging mode is selected (YES in S140), control device 205 causes in step S150 relays RAC1 and RAC2 to open and relay RPV to close. Further, in step S160, control device 205 stops inverter 230. Accordingly, the electric power supply path from system power supply 400 to electric power line PLb is shut off.

Further, control device 205 compares, in step S170, output voltage Vpv of DC power source 210 with voltage Vch which is necessary for charging main battery 110. Vch can be set in accordance with the SOC or the voltage of main battery 110.

When Vpv>Vch (YES in S170), control device 205 proceeds to step S180 to stop converter 220. This is because electric power can still be supplied from DC power source 210 to electric power line PLb through the path of diode Da shown in FIG. 1 even when converter 220 is stopped. Under this voltage condition, switching elements Qa and Qb are fixed in the OFF state so that external charging can be performed with high efficiency without causing a switching loss in converter 220 to be generated.

In contrast, when Vpv<Vch (NO in step S170), control device 205 proceeds to step S190 to cause converter 220 to operate. Accordingly, DC voltage VI generated by boosting output voltage Vpv of DC power source 210 under ON/OFF control of switching elements Qa, Qb is output to electric power line PLb. The command value for DC voltage Vl at this time is set comparable to or higher than Vch. In this way, the charging voltage and the charging current for main battery 110 are controlled.

Thus, through the process from step S150 to step S190, the external charging operation in the eco-charging mode is implemented.

In contrast, when the eco-charging mode is not selected (NO in step S140), control device 205 causes, in step S200, relays RAC1, RAC2 to be closed. Further, in step S210, control device 205 causes inverter 230 to operate. Inverter 230 is controlled so that it converts AC voltage Vac of electric power line PLd into a DC voltage and outputs the resultant DC voltage to electric power line PLc (PLb).

Control device 205 further determines, in step S220, whether or not supplied electric power Ppv from DC power source 210 is larger than a predetermined electric-power value P0.

When supplied electric power Ppv from DC power source 210 is smaller, there is a possibility that the efficiency of electric power supply by DC power source 210 is decreased. Therefore, when Ppv<P0 (NO in S220), control device 205 proceeds to step S250 to cause relay RPV to open and proceeds to step S260 to cause converter 220 to stop. Accordingly, where the efficiency of charging by DC power source 210 will decrease, only the electric power from system power supply 400 can be used to charge main battery 110 and thereby avoid decrease of efficiency in external charging.

In contrast, when Vpv>P0 (YES in S220), control device 205 proceeds to step S230 to cause relay RPV to be closed and proceeds to step S240 to cause converter 220 to operate. Accordingly, where the efficiency of charging by DC power source 210 will not decrease, both the electric power from system power supply 400 and the electric power from DC power source 210 can be used to speedily charge main battery 110. In step S240, preferably converter 220 is controlled so that it performs so-called maximum power point tracking control (MPPT control). In this case, the output power (current) from DC power source 210 can be controlled so that the efficiency of DC power source 210 is at the maximum, and therefore external charging can be made more efficient.

Thus, through the process from step S200 to step S260, the external charging operation by means of system power supply 400 is implemented.

Next, a control process when the vehicle power generation mode is selected (YES in S120) will be described.

When the vehicle power generation mode is selected, control device 205 proceeds to step S300 to obtain, from electrically-powered vehicle 100, a command value for electric power to be generated. For example, in electrically-powered vehicle 100, the electric power which can be generated and output can be set based on the state (such as SOC) of main battery 110. In step S300, in consideration of the electric power to be generated by electrically-powered vehicle 100, a command for electric power to be generated by power conversion facility 200 is corrected from the one in the normal mode.

In contrast, when the vehicle power generation mode is not selected (NO in S120), no electric power is given and received between power conversion facility 200 and main battery 110 of electrically-powered vehicle 100. Namely, in this case, power conversion facility 200 operates in the normal mode. At this time, no power is generated by electrically-powered vehicle 100 and therefore step S300 is skipped.

Regardless of the vehicle power generation mode and the normal mode, control device 205 causes in step S310 relay RPV and relays RAC1, RAC2 to be closed. Further, in step S320, control device 205 causes converter 220 to operate. Converter 220 is controlled so that it performs a voltage conversion on output voltage Vpv from DC power source 210 and outputs the resultant voltage to electric power line PLb. In step S320 as well, converter 220 preferably operates in accordance with the MPPT control as in step S240.

Further, in step S330, control device 205 causes inverter 230 to operate. Inverter 230 is controlled so that it converts DC power of electric power line PLb into AC voltage Vac and outputs the AC voltage to electric power line PLd.

In the vehicle power generation mode, there may possibly be a case where the electric power generated by electrically-powered vehicle 100 is enough so that the electric power which is output from DC power source 210 is unnecessary. In such a case, supply of electric power from DC power source 210 may be stopped. In this case, control device 205 causes in step S310 relay RPV to be opened and causes in step S320 converter 220 to be stopped.

Thus, through the process from step S300 to step S330, the power generating operation of using electric power from main battery 110 of electrically-powered vehicle 100 and/or electric power from DC power source 210 to output the resultant AC power to system power supply 400 is implemented.

When electrically-powered vehicle 100 is not connected (NO in S100), the above-described processes relevant to electrically-powered vehicle 100 are not performed and power conversion facility 200 operates in the normal mode.

Figure 3:
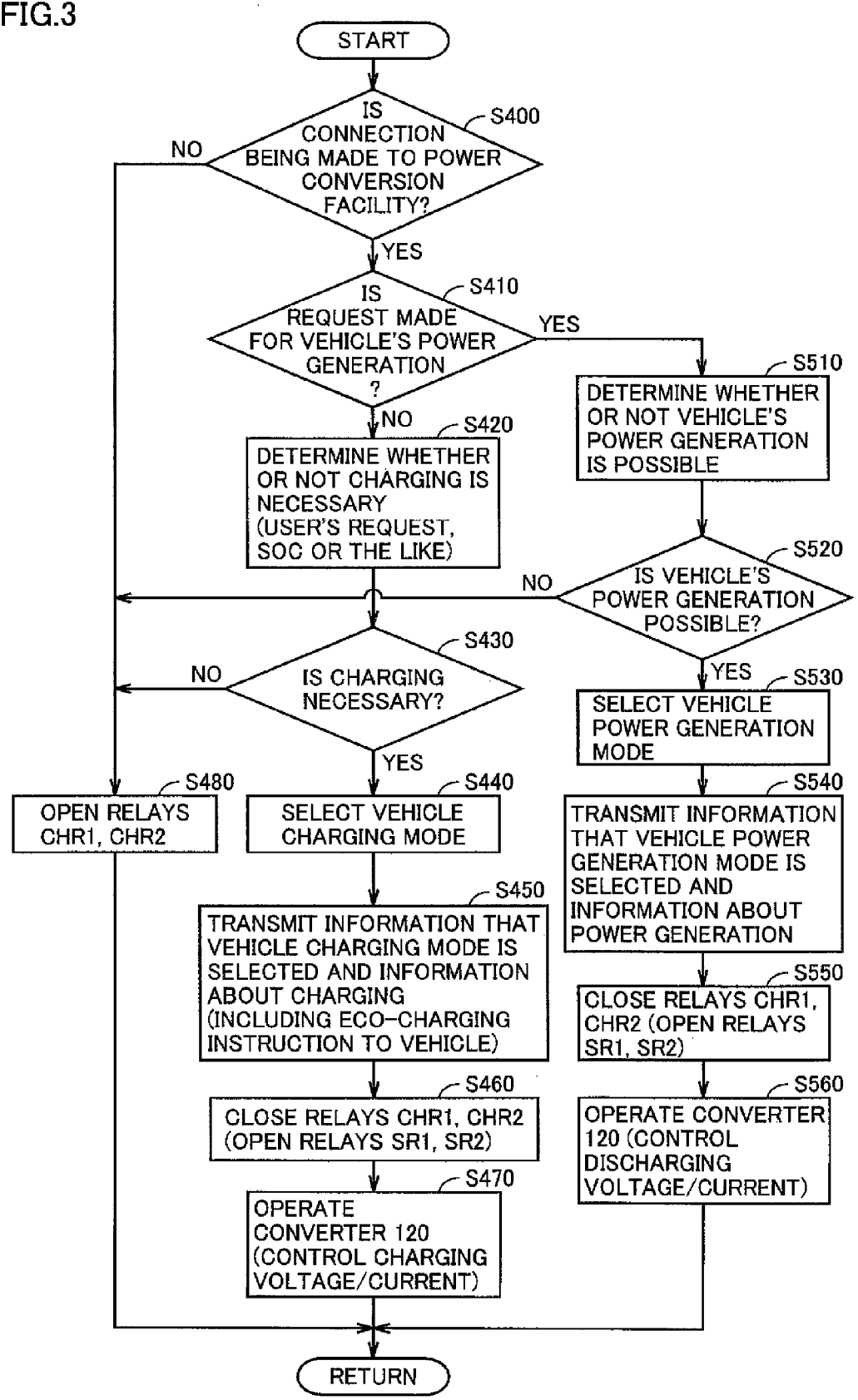
FIG. 3 is a flowchart illustrating a control process performed in an electrically-powered vehicle of the charging system according to the first embodiment of the present invention.

FIG. 3 is a flowchart illustrating a control process performed in electrically-powered vehicle 100 of the charging system in the first embodiment of the present invention. Each step shown in the flowchart of FIG. 3 is performed through a software process and/or a hardware process performed by control device 105. Control device 105 performs the control process in accordance with the flowchart of FIG. 3 periodically at predetermined intervals.

Referring to FIG. 3, control device 105 determines in step S400 whether or not electrically-powered vehicle 100 is connected to power conversion facility 200 by charging cable 300. The determination in step S400 can be made based on the state of connection of charging cable 300, similarly to step S100 in FIG. 2.

When electrically-powered vehicle 100 is connected to power conversion facility 200 (YES in S400), control device 105 determines in step S410 whether or not a request is made for generation of AC power by means of the electric power of main battery 110, namely a request is made for power generation by the vehicle. The user's request for power generation by the vehicle may be input to control device 205 in power conversion facility 200 or to control device 105 in electrically-powered vehicle 100.

When the request for power generation by the vehicle is not made (NO in S410), control device 105 proceeds to step S420 to determine whether or not it is necessary to charge main battery 110. For example, the determination in step S420 is made in accordance with a user's request which is input to control device 105 or 205, the state (such as SOC) of main battery 110, or the like.

For example, in the case where a user requests charging of main battery 110 and main battery 110 is in the state of being able to be charged, it is determined that "charging is necessary." In contrast, if main battery 110 is in the state of being unable to be charged, the determination "charging is necessary" is not made even if a user requests charging. The fact itself that connection is made by charging cable 300 may be identified as a user's request for charging.

Control device 105 confirms, in step S430, the result of determination which has been made in step S420. When it is determined that "charging is necessary" (YES in S430), control device 105 proceeds to step S440 to select the vehicle charging mode. Then, in step S450, control device 105 transmits to control device 205 the information that the vehicle charging mode is selected and information about charging of main battery 110.

The information transmitted in step S450 includes a value of requested charging power. This is a request made to power conversion facility 200 for charging main battery 110. In the case where electrically-powered vehicle 100 has been instructed to select "eco-charging," this instruction is also transmitted in step S450.

When the vehicle charging mode has been selected, control device 105 proceeds to step S460 to close charging relays CHR1, CHR2. At this time, system relays SR1, SR2 are opened. Further, control device 105 proceeds to step S470 to cause converter 120 to operate. Converter 120 is controlled so that it converts DC power transmitted from power conversion facility 200 to charging inlet 190 into electric power for charging main battery 110. In this way, the charging voltage or charging current for main battery 110 is appropriately controlled.

In contrast, when the vehicle charging mode has not been selected (NO in S430), control device 105 proceeds to step S480 to open charging relays CHR1, CHR2. In this way, converter 120 and main battery 110 are electrically disconnected from charging inlet 190.

When electrically-powered vehicle 100 is not connected to power conversion facility 200 (NO in step S400) as well, control device 105 proceeds to step S480 to open charging relays CHR1, CHR2.

When electrically-powered vehicle 100 is connected to power conversion facility 200 (YES in S400) and a user requests generation of electric power by the vehicle (YES in S410), control device 105 determines in step S510 whether or not electric power can be generated by the vehicle, based on the state of main battery 110.

For example, in the case where main battery 110 is in the state that enables the vehicle to generate electric power, it is determined that "vehicle's power generation is possible." In contrast, when main battery 110 is in the state where the battery cannot be discharged, the determination that "vehicle's power generation is possible" is not made, even if a user's request has been made.

Control device 105 confirms, in step S520, the result of determination which has been made in step S510. When it is determined that "vehicle's power generation is possible" (YES in S520), control device 105 proceeds to step S530 to select the vehicle power generation mode. Then, in step S540, control device 105 transmits to control device 205 the information that the vehicle power generation mode is selected and information about vehicle's power generation. The information transmitted in step S540 includes a value of electric power to be discharged from main battery 110.

When the vehicle power generation mode has been selected (S530), control device 105 proceeds to step S550 to close charging relays CHR1, CHR2. At this time, system relays SR1, SR2 are opened.

Further, control device 105 proceeds to step S560 to cause converter 120 to operate. While controlling the current (electric power) discharged from main battery 110, converter 120 converts an output voltage of main battery 110 into DC voltage VH and outputs the resultant DC voltage to electric power line PL1. Accordingly, the DC power of electric power line PL1 controlled by converter 120 is transmitted through charging inlet 190 and charging cable 300 to connector 290 and electric power line PLb of power conversion facility 200. In power conversion facility 200, inverter 230 converts the DC power of electric power line PLb into AC power and accordingly the AC power is output to system power supply 400, as described above.

In contrast, when the determination "vehicle's power generation is possible" is not made (NO in S520), control device 105 proceeds to step S480 without selecting the vehicle power generation mode. Accordingly, charging relays CHR1, CHR2 are opened and therefore main battery 110 is electrically disconnected from charging inlet 190.

As heretofore described, in power conversion facility 200, electrically-powered vehicle 100, and charging system 10 including them in the first embodiment, isolation transformer 240 provided in power conversion facility 200 can be used to charge main battery 110 from system power supply 400. In other words, external charging with ensured electrical isolation can be done without increasing the components mounted on electrically-powered vehicle 100. Moreover, inverter 230 and converter 220 of power conversion facility 200 can be used to quickly charge main battery 110 with a relatively large capacity. In other words, power conversion facility 200 can be used similarly to the present embodiment to implement, at low cost and with great safety, an infrastructure for quickly charging a power storage device mounted on a vehicle.

Further, when the electric power of main battery 110 is used to generate AC power (vehicle power generation mode) as well, isolation transformer 240 enables electrical isolation of electrically-powered vehicle 100 and system power supply 400 from each other.

Moreover, relays RAC1, RAC2 and relay RPV can be disposed in power conversion facility 200 to appropriately select the manner of charging main battery 110. Specifically, a switch can be made between eco-charging by means of only DC power source 210 and quick charging by means of both DC power source 210 and system power supply 400. In addition, when the output of DC power source 210 is low, DC power source 210 cannot be used to prevent reduction of the efficiency of external charging.

Second Embodiment

Figure 4:
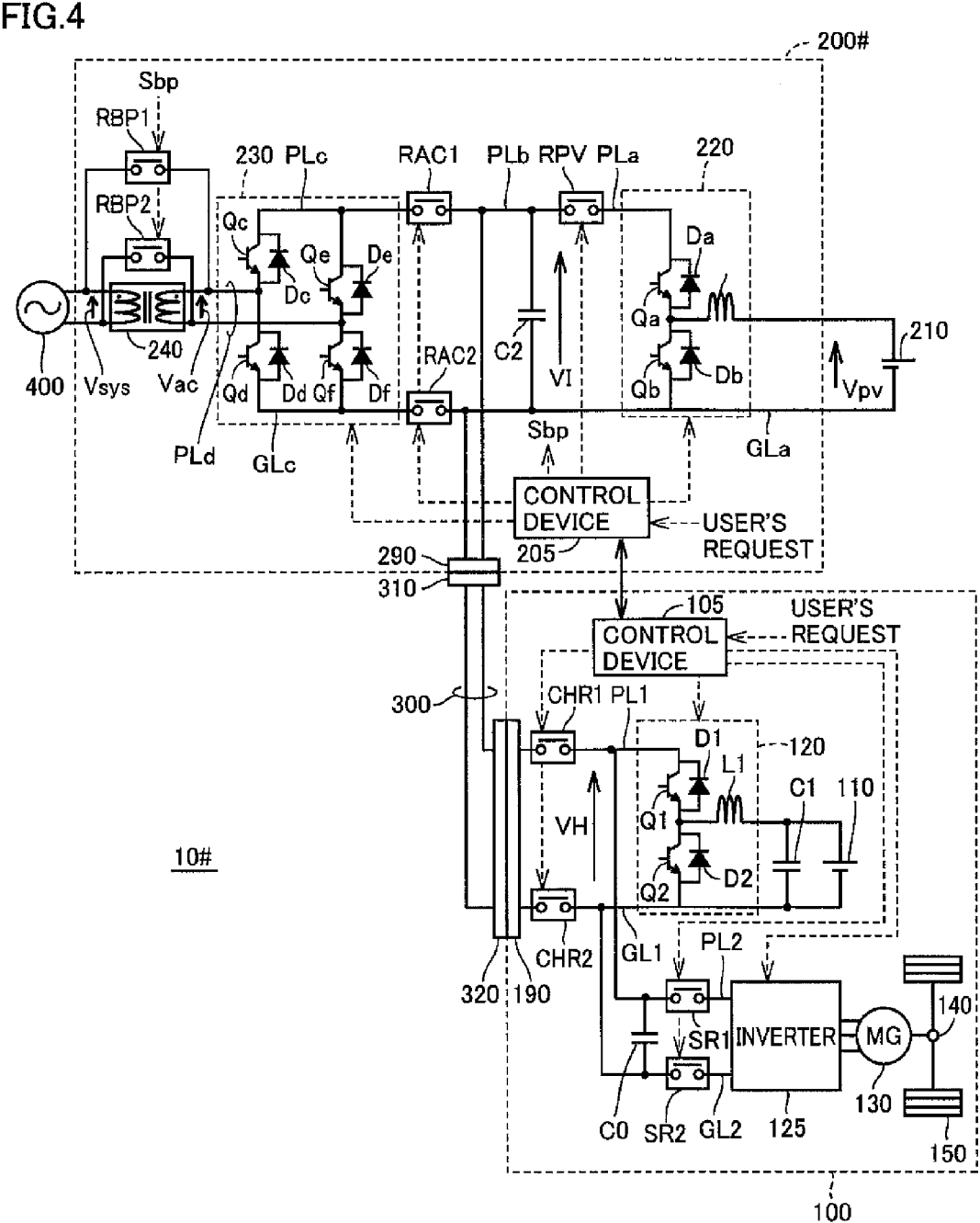
FIG. 4 is a block diagram illustrating a configuration of a charging system for an electrically-powered vehicle according to a second embodiment of the present invention.

FIG. 4 is a block diagram illustrating a configuration of a charging system 10# for an electrically-powered vehicle according to a second embodiment of the present invention.

From a comparison of FIG. 4 with FIG. 1, it is seen that charging system 10# in the second embodiment is provided with a power conversion facility 200# instead of power conversion facility 200 shown in FIG. 1. Power conversion facility 200# differs from power conversion facility 200 shown in FIG. 1 in that the former further includes relays RBP1, RBP2 for bypassing isolation transformer 240. Open/close of relays RBP1, RBP2 is controlled based on a control signal Sbp from control device 205.

Relays RBP1, RBP2 are disposed between system power supply 400 and electric power line PLd in such a manner that isolation transformer 240 is bypassed. Therefore, when relays RBP1, RBP2 are closed, system power supply 400 and electric power line PLd are electrically connected to each other, bypassing isolation transformer 240. Relays RBP1, RBP2 correspond to "second switch."

The configurations and operations of the other components of power conversion facility 200# are similar to those of power conversion facility 200 shown in FIG. 1 and therefore the description thereof will not be repeated. In addition, the configuration of electrically-powered vehicle 100 is similar to that in FIG. 1 and therefore the description thereof will not be repeated.

Next, FIGS. 5 and 6 will be used to describe control of open/close of relays RBP1, RBP2. Features other than open/close control of relays RBP1, RBP2 are similar to those of the control process in the first embodiment and therefore the description thereof will not be repeated.

FIG. 5 is a flowchart illustrating a control process for relays RBP1, RBP2 that is performed by power conversion facility 200#. The flowchart shown in FIG. 5 is repeatedly performed by control device 205 at predetermined intervals. Each step shown in FIG. 5 is also performed through a software process and/or a hardware process performed by control device 205.

Referring to FIG. 5, control device 205 determines in step S600 whether or not electrically-powered vehicle 100 is connected to power conversion facility 200#, similarly to step S100. When electrically-powered vehicle 100 is connected (YES in S600), control device 205 determines in step S610 whether or not the vehicle charging mode is selected. When the vehicle charging mode is not selected (NO in S610), control device 205 proceeds to step S620 to determine whether or not the vehicle power generation mode is selected.

When the vehicle charging mode is selected (YES in S610) or the vehicle power generation mode is selected (YES in S620), control device 205 proceeds to step S650 to select an electric power conversion through the path including isolation transformer 240. Namely, control device 205 proceeds to step S660 to instruct relays RBP1, RBP2 to be opened.

Accordingly, in the case of the vehicle charging mode or the vehicle power generation mode, namely in the case where electric power is given and received between system power supply 400 and main battery 110, the electric power conversion is performed through isolation transformer 240 as described above in connection with the first embodiment.

In contrast, when both the vehicle charging mode and the vehicle power generation mode fail to be selected (NO in S620), control device 205 proceeds to step S670 to select the electric power conversion path that bypasses isolation transformer 240. Namely, in the normal mode of power conversion facility 2004, control device 205 proceeds to step S680 to close relays RBP1, RBP2.

When electrically-powered vehicle 100 is not connected to power conversion facility 200# (NO in S600), control device 205 proceeds to step S690 to close relays RBP1, RBP2. Accordingly, the path bypassing isolation transformer 240 is selected.

As described above, when main battery 110 of electrically-powered vehicle 100 is not charged/discharged, the path bypassing isolation transformer 240 is selected. Accordingly, in the normal mode, DC power from DC power source 210 can be converted into AC power without causing a loss to be generated in isolation transformer 240. Consequently, the power conversion efficiency in the normal mode can be improved.

FIG. 6 illustrates a control process for relays RBP1, RBP2 shown in FIG. 4 that is performed in response to a request from electrically-powered vehicle 100. The flowchart shown in FIG. 6 is repeatedly performed by control device 105 at predetermined intervals. Each step shown in FIG. 6 is also performed through a software process and/or a hardware process performed by control device 105.

Referring to FIG. 6, control device 105 determines in step S700 whether or not electrically-powered vehicle 100 is connected to power conversion facility 200#, similarly to step S400. When electrically-powered vehicle 100 is connected to power conversion facility 200# (YES in S700), control device 105 determines in step S710 whether the vehicle charging mode or the vehicle power generation mode is selected. As described above, the vehicle charging mode and the vehicle power generation mode are selected respectively in steps S440 and S530 in FIG. 3.

When the vehicle charging mode or the vehicle discharging mode is selected (YES in S710), control device 105 makes a request to power conversion facility 200# in step S720 for electric power conversion through isolation transformer 240. Namely, a request to open relays RBP1, RBP2 is made. Accordingly, in power conversion facility 200#, steps S650 and S660 in FIG. 5 are performed.

In contrast, when none of the vehicle charging mode and the vehicle power generation mode is selected (NO in S710), control device 105 makes a request to power conversion facility 200# in step S730 for electric power conversion which bypasses isolation transformer 240. Namely, a request to close relays RBP1, RBP2 is made. Accordingly, in power conversion facility 200#, steps S670 and S680 in FIG. 5 are performed.

Thus, a control process in which a direct request to open or close relays RBP1, RBP2 is made from electrically-powered vehicle 100 to power conversion facility 200# is also possible.

Moreover, when electrically-powered vehicle 100 is not connected to power conversion facility 200# (NO in S700), control device 105 does not make a request to power conversion facility 200# for open/close of relays RBP1, RBP2. In this case, power conversion facility 200# operates in the normal mode so that relays RBP1, RBP2 are closed and the path bypassing the isolation transformer 240 is selected.

As heretofore described, charging system 10# in the second embodiment enables an electric power conversion bypassing isolation transformer 240 and an electric power conversion with electrical isolation ensured by means of isolation transformer 240 to be selected in power conversion facility 200#. Accordingly, in the case where the electric power conversion is not performed between electrically-powered vehicle 100 and system power supply 400, the output power of DC power source 210 can be converted into AC power at high efficiency without causing an electric power loss to be generated in isolation transformer 240. As to the electric power conversion between electrically-powered vehicle 100 and system power supply 400, electrical isolation can be ensured in a similar manner to the first embodiment to thereby enhance safety.

Respective configurations of inverter 230 and converters 120, 220 in the first and second embodiments are not limited to the exemplary ones in FIGS. 1 and 4. As long as the DC-AC power conversion and the DC voltage conversion equivalent to those described in connection with the first and second embodiments can be executed, any circuit configurations may be applied.

Moreover, regarding the first and second embodiments, the configuration of the system located subsequently to electric power line PL2 and ground line GL2 (the system for running the vehicle) is not limited to the configuration shown in the drawings. Namely, as described above, the present invention is commonly applicable to electrically-powered vehicles mounted with a motor for running the vehicle, such as electric vehicle, hybrid vehicle, fuel cell vehicle, and the like.

It should be construed that the embodiments disclosed herein are by way of illustration in all respects, not by way of limitation. It is intended that the scope of the present invention is defined by claims, not by the description above, and encompasses all modifications and variations equivalent in meaning and scope to the claims.

INDUSTRIAL APPLICABILITY

The present invention is applicable to external charging of a power storage device mounted on an electrically-powered vehicle such as hybrid vehicle, electric vehicle, fuel cell vehicle, or the like.

REFERENCE SIGNS LIST 10, 10# charging system; 100 electrically-powered vehicle; 105, 205 control device (ECU); 110 main battery; 120, 220 converter; 125, 230 inverter; 130 motor generator; 140 power transmission gear; 150 drive wheel; 190 charging inlet; 200, 200# power conversion facility; 210 DC power source; 240 isolation transformer; 290 connector (power conversion facility); 300 charging cable; 310, 320 connector (charging cable); 400 system power supply; C0, C1, C2 smoothing capacitor; CHR1, CHR2 charging relay; D1, D2, Da to Df diode; GL1, GL2, GLa, GLc ground line; L1, L2 reactor; P0 predetermined electric-power value; PL1, PL2 electric power line (electrically-powered vehicle); PLa, PLb, PLc, PLd electric power line (power conversion facility); Q1, Q2, Qa to Qf power semiconductor switching element; RAC1, RAC2, RPV relay; RBP1, RBP2 relay (bypass); SR1, SR2 system relay; Sbp control signal (bypass relay); VH, VI, Vpv DC voltage; Vac, Vsys AC voltage

The invention claimed is:

1. A charging system for an electrically-powered vehicle, the charging system comprising:
a power conversion facility provided between a DC power source and a system power supply; and
an electrically-powered vehicle having a power storage device mounted in the electrically-powered vehicle, the power conversion facility being separate from and located externally of the electrically-powered vehicle,
the power conversion facility including:
an inverter configured to perform a bidirectional DC-AC power conversion between a first electric power line electrically connected to the DC power source and a second electric power line;
a first switch connected between the first electric power line and the inverter;
an isolation transformer connected between the second electric power line and the system power supply; and
a connector electrically connected to the first electric power line,
the electrically-powered vehicle including:
a charging inlet configured to be electrically connected to the first electric power line by a charging cable; and
a converter configured to convert DC power transmitted to the charging inlet from the power conversion facility into charging power for the power storage device, and
the power conversion facility further including
a control unit configured to close the first switch and control the inverter to cause the inverter to convert AC power from the system power supply into DC power and output the DC power to the first electric power line, in a case where the power storage device is to be charged under a condition that the connector is electrically connected to the charging inlet.

2. The charging system according to claim 1, wherein
the power conversion facility further includes a second switch provided between the system power supply and the second electric power line to bypass the isolation transformer, and
the control unit opens the second switch while electric power is being given and received between the system power supply and the power storage device.

3. The charging system according to claim 2, wherein
the control unit closes the second switch in controlling the inverter in such a manner that causes the inverter to convert DC power from the DC power source into AC power for the system power supply, in a case where electric power is not being given and received between the system power supply and the power storage device.

4. The charging system according to claim 1, wherein
the power conversion facility further includes a third switch connected between the DC power source and the first electric power line, and
in a case where the power storage device is to be charged under a condition that the connector is electrically connected to the charging inlet, the control unit opens the third switch when supplied electric power from the DC power source is smaller than a threshold value.

5. The charging system according to claim 1, wherein
in a case where the AC power is to be generated from electric power of the power storage device under a condition that the connector is electrically connected to the charging inlet, the control unit closes the first switch and controls the inverter in such a manner that causes the inverter to convert DC power which is output from the power storage device to the first electric power line into AC power for the system power supply and output the AC power to the second electric power line.

6. The charging system according to claim 1, wherein
the control unit is configured to select one of a plurality of charging modes in a case where the power storage device is to be charged under a condition that the connector is electrically connected to the charging inlet,
the plurality of charging modes includes a first charging mode and a second charging mode,
in the first charging mode, the first switch is closed and the inverter converts AC power from the system power supply into DC power and outputs the DC power to the first electric power line, and
in the second charging mode, the first switch is opened, the inverter is stopped, and electric power from the DC power source is output to the first electric power line.

7. A power conversion facility provided between a DC power source and a system power supply, the power conversion facility comprising:
an inverter configured to perform a bidirectional DC-AC power conversion between a first electric power line electrically connected to the DC power source and a second electric power line;
a first switch connected between the first electric power line and the inverter;
an isolation transformer connected between the second electric power line and the system power supply;
a connector electrically connected to the first electric power line and configured to be electrically connectable to a charging inlet of an electrically-powered vehicle by a charging cable,
the connector being configured to be further electrically connected to a power storage device mounted on the electrically-powered vehicle by being connected to the charging inlet by the charging cable; and a control unit configured to close the first switch and control the inverter to cause the inverter to convert AC power from the system power supply into DC power and output the DC power to the first electric power line, in a case where the power storage device is to be charged under a condition that the connector is electrically connected to the charging inlet.

8. The power conversion facility according to claim 7, further comprising a second switch provided between the system power supply and the second electric power line to bypass the isolation transformer, wherein
the control unit opens the second switch while electric power is being given and received between the system power supply and the power storage device.

9. The power conversion facility according to claim 8, wherein
the control unit closes the second switch in controlling the inverter in such a manner that causes the inverter to convert DC power from the DC power source into AC power for the system power supply, in a case where electric power is not being given and received between the system power supply and the power storage device.

10. The power conversion facility according to claim 7, further comprising a third switch connected between the DC power source and the first electric power line, wherein
in a case where the power storage device is to be charged under a condition that the connector is electrically connected to the charging inlet, the control unit opens the third switch when supplied electric power from the DC power source is smaller than a threshold value.

11. The power conversion facility according to claim 7, wherein
in a case where the AC power is to be generated from electric power of the power storage device under a condition that the connector is electrically connected to the charging inlet, the control unit closes the first switch and controls the inverter in such a manner that causes the inverter to convert DC power which is output from the power storage device to the first electric power line into AC power for the system power supply and output the AC power to the second electric power line.

12. The power conversion facility according to claim 7, wherein
the control unit is configured to select one of a plurality of charging modes in a case where the power storage device is to be charged under a condition that the connector is electrically connected to the charging inlet,
the plurality of charging modes includes a first charging mode and a second charging mode,
in the first charging mode, the first switch is closed and the inverter converts AC power from the system power supply into DC power and outputs the DC power to the first electric power line, and
in the second charging mode, the first switch is opened, the inverter is stopped, and electric power from the DC power source is output to the first electric power line.

13. An electrically-powered vehicle comprising:
a power storage device;
a charging inlet configured to be electrically connectable, by a charging cable, to a connector of a power conversion facility provided between a DC power source and a system power supply;
a first power conversion unit configured to convert DC power transmitted to the charging inlet into charging power for the power storage device; and
a control unit configured to request the power conversion facility to charge the power storage device,
in a case where the power storage device is to be charged under a condition that the charging inlet and the connector are electrically connected to each other by the charging cable, the control unit requesting the power conversion facility
(i) to control an inverter, which is configured to perform a bidirectional DC-AC power conversion between a first electric power line electrically connected to the DC power source and a second electric power line connected to the system power supply through an isolation transformer in such a manner that causes the inverter to convert AC power from the system power supply into DC power and output the DC power to the first electric power line, and
(ii) to close a first switch connected between the first electric power line and the inverter.

14. The electrically-powered vehicle according to claim 13, wherein
in a case where the AC power is to be generated from electric power of the power storage device under a condition that the connector and the charging inlet are electrically connected to each other by the charging cable, the control unit requests the power conversion facility
(a) to close the first switch and
(b) to control the inverter in such a manner that causes the inverter to convert DC power which is output from the power storage device to the first electric power line into AC power for the system power supply and output the AC power to the second electric power line.

15. The electrically-powered vehicle according to claim 13, wherein
while electric power is being given and received between the system power supply and the power storage device, the control unit requests the power conversion facility to open a second switch provided between the system power supply and the second electric power line in such a manner that the isolation transformer is bypassed.

16. The electrically-powered vehicle according to claim 15, wherein
in a case where electric power is not being given and received between the system power supply and the power storage device, the control unit requests the power conversion facility to close the second switch in controlling the inverter in such a manner that causes the inverter to convert DC power from the DC power source into AC power for the system power supply.

17. The electrically-powered vehicle according to claim 13, wherein
in a case where the power storage device is to be charged under a condition that the connector and the charging inlet are electrically connected to each other, the control unit requests the power conversion facility to open a third switch connected between the DC power source and the first electric power line, when supplied electric power from the DC power source is smaller than a threshold value.

18. The electrically-powered vehicle according to claim 13, wherein
the first power conversion unit is configured to perform a bidirectional DC voltage conversion between a third electric power line and the power storage device, and
the electrically-powered vehicle further comprises:
a first switch element connected between the charging inlet and the third electric power line;
an electric motor for generating vehicle driving force;
a second power conversion unit configured to control an output of the electric motor by performing a bidirectional power conversion between the third electric power line and the electric motor; and a second switch element connected between the third electric power line and the second power conversion unit.

19. The electrically-powered vehicle according to claim 13, wherein the control unit is configured to select one of a plurality of charging modes in a case where the power storage device is to be charged under a condition that the connector and the charging inlet are electrically connected to each other, the plurality of charging modes includes a first charging mode and a second charging mode, in the first charging mode, the control unit instructs the first switch to be closed and the inverter to convert AC power from the system power supply into DC power and output the DC power to the first electric power line, and in the second charging mode, the control unit instructs the first switch to be opened, the inverter to be stopped, and electric power from the DC power source to be output to the first electric power line.

* * * * *